United States Patent
Marans et al.

[11] 3,912,608
[45] Oct. 14, 1975

[54] PROCESS FOR CURING A RADIATION COMPOSITION COMPRISING AN EPOXY COMPOUND AND AN AMINO ACRYLATE

[75] Inventors: Nelson S. Marans; Alfred Gluecksmann, both of Silver Spring, Md.

[73] Assignee: W. R. Grace & Co., New York, N.Y.

[22] Filed: June 19, 1974

[21] Appl. No.: 480,648

Related U.S. Application Data
[62] Division of Ser. No. 389,316, Aug. 17, 1973.

[52] U.S. Cl.. 204/159.15; 204/159.18; 204/159.23; 260/836; 260/837 R; 117/93.31
[51] Int. Cl........ B01j 1/10; B01j 1/12; C08f 33/08
[58] Field of Search.................. 260/836, 837 R; 204/159.15, 159.18, 159.23

[56] References Cited
UNITED STATES PATENTS
3,455,858   7/1969   Taft ........................................ 260/22

OTHER PUBLICATIONS
Chem. Abstracts, Vol. 72, 1970, No. 101,928a.
Chem. Abstracts, Vol. 77, 1972, No. 49472j.

*Primary Examiner*—Murray Tillman
*Assistant Examiner*—Richard B. Turer
*Attorney, Agent, or Firm*—Elton Fisher

[57] ABSTRACT

A radiation curable epoxy composition prepared by admixing an epoxy compound having the formula

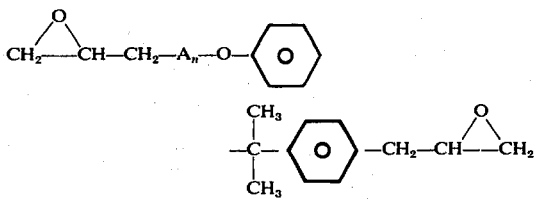

in which A is

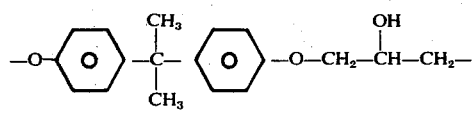

and $n$ has an average value of 0–13 and a compound having the formula

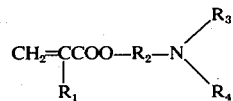

in which $R_1$, $R_3$, and $R_4$ are lower alkyl groups, and $R_2$ is an alkylene group having 2–8 carbon atoms.

9 Claims, No Drawings

PROCESS FOR CURING A RADIATION COMPOSITION COMPRISING AN EPOXY COMPOUND AND AN AMINO ACRYLATE

BACKGROUND OF THE INVENTION

This is a division of application Ser. No. 389,316 filed Aug. 17, 1973.

This invention is in the field of radiation induced polymerization. More particularly, this invention is directed to an epoxy composition which can be polymerized by radiation. Such composition can be prepared by intimately mixing 40–95 parts of an epoxy compound having the formula

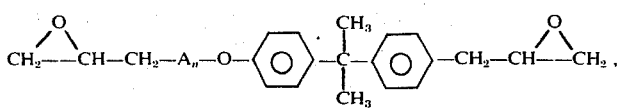

in which A is

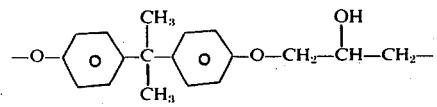

and $n$ has an average value of 0–13, and 5–60 parts of a compound having the formula

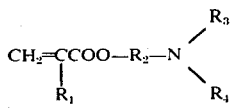

in which $R_1$ is hydrogen or a lower alkyl group, $R_3$, and $R_4$ are lower alkyl groups, and $R_2$ is an alkylene group having 2–8 carbon atoms.

$R_1$ can be the same as or different from $R_3$ and/or $R_4$.

Epoxy compounds of the type recited above are well known to those skilled in the art and are described in:

1. Lee et al, "Epoxy Resins, Their Application and and Technology," McGraw-Hill Book Company, Inc., New York, New York 1957.
2. Lenz, "Organic Chemistry of Synthetic High Polymers," John Wiley & Sons Inc., New York, New York 1968.
3. The Kirk-Othmer Encyclopedia of Chemical Technology, John Wiley & Sons, Inc., New York, New York Vol. 8, 1965.

U.S. Pat. No. 3,674,545 (Strolle, 117/93.31) teaches the use of high energy ionizing radiation to cure a rather complex mixture having an epoxy phosphate syrup as one of its components.

SUMMARY OF THE INVENTION

In summary, this invention is directed to a radiation curable composition consisting essentially of an intimate mixture of 40-95 parts of an epoxy compound having the formula

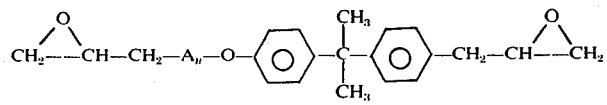

in which A is

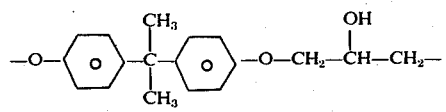

and $n$ has an average value of 0–13 and 5–60 parts of an ethylenically unsaturated compound having the formula

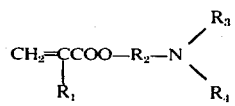

in which $R_1$ is hydrogen or a lower alkyl group, $R_3$, and $R_4$ are lower alkyl groups, and $R_2$ is an alkylene group having 2–8 carbon atoms.

DESCRIPTION OF PREFERRED EMBODIMENTS

In preferred embodiments of the invention recited in the above Summary:

1. $n$ is 0–6.
2. There are present 40–95 parts of the epoxy compound and 5–60 parts of the ethylenically unsaturated compound.
3. $R_1$, $R_3$, and $R_4$ are methyl groups and $R_2$ is $CH_2CH_2$.
4. There is present 0.01–5 parts (more preferably 0.05–1.5 parts) of a photocuring rate accelerator per 100 parts of the epoxy compound. Preferred photocuring rate accelerators include benzophenone, dibenzosuberone, or acetophonone.
   a. Where the photocuring rate accelerator is present the composition can be cured by a process comprising irradiating a film (or coating) of the composition with actinic light (actinic radiation, preferably having a wave length of 2,000–4,000 A at a rate to provide 0.0001–20 watts per square centimeter of film surface for a period of about 0.001–120 minutes (preferably 0.01–60 minutes.)
5. Where a photocuring rate accelerator is present it is preferred to have present 100 parts of the epoxy compound and 5–170 parts of the ethylenically unsaturated compound.

In another preferred embodiment ("Embodiment A") this invention is directed to; (a) a process for curing (polymerizing) the composition of the above Summary comprising irradiating said composition with 0.1–5 Mrads (more preferably 0.5–2.5 Mrads) of high energy ionizing radiation; and (b) to the polymer formed by said process.

In another preferred embodiment ("Embodiment B") this invention is directed to; (a) a process for curing (polymerizing a mixture consisting essentially of the composition of the above Summary in which there is present (and intimately admixed therein) 0.01–5 parts of a photocuring rate accelerator per 100 parts of the epoxy compound of said Summary, said process comprising irradiating a film of said mixture with actinic light preferably having a wave length of 2,000–4.000A at a rate to provide 0.0001–20 watts per square centimeter of film surface; and (*b*) the polymer formed by said process.

DETAILED DESCRIPTION OF THE INVENTION

We have made the surprising discovery that compositions consisting essentially of an intimate mixture of an epoxy compound of the type recited in the above Summary and an ethylenically unsaturated compound having the formula

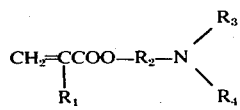

in which $R_1$ is hydrogen or a lower alkyl group, and $R_3$ and $R_4$ are lower alkyl groups and $R_2$ is an alkylene group having 2–8 carbon atoms is cured (polymerized) where subjected to high energy ionizing radiation including X-rays, gamma rays, an electron beam, a neutron beam, or a proton beam. The radiation dosage required to produce a good cure being about 0.1–5.0 (preferably about 0.5–2.5) Mrads.

This result (the curing of our composition) is surprising because a similar dosage of radiation failed to cure the epoxy component of our composition where said epoxy component was irridiated in the absence of the ethylenically unsaturated compound.

This result (the curing of our composition) is even more surprising because a similar dosage of radiation failed to cure our ethylenically unsaturated compound in the absence of the epoxy compound.

Our composition was stable and did not polymerize where stored for several weeks in the absence of significant radiation.

We have also found that, where a photocuring rate accelerator (or a mixture of such accelerators) is present in our composition (an intimate mixture of the epoxy compound and the ethylenically unsaturated compound, both being described in the above Summary) said composition is readily cured by irradiation with actinic light including ultraviolet light having a wave length of about 2,000–4,000 A.

Preferred photocuring rate accelerators include but are not limited to benzophenone, acetophenone, acenaphthenequinone, o-methoxybenzophenone, thioxanthen-9-one, xanthen-9-one, 7H-benz[de]anthracen-7-one, dibenzosuberone, 1-naphthaldehyde, 4,4'-bis(dimethylamino) benzophenone, fluoren-9-one, 1-indanone, 2-tert-butylanthraquinone, valerophenone, hexanophenone, 8-phenylbutyrophenone, p-morpholinoproprophenone 4-morpholinobenzophenone, 4'-morpholinodeoxybenzoin, p-diacetylbenzene, 4-aminobenzophenone, 4'-methoxyacetophenone, benzaldehyde, α-tetralone, 9-acetylphenanthrene, 2-acetylphenanthrene, , 10-thioxanthenone, 3-acetylphenanthrene, 3-acetylindole, 1,3,5-triacetylbenzene, and the like including mixtures thereof.

Admixtures of our above described epoxy compound and the photocuring rate accelerator (95–99.9 parts of the epoxy compound and 0.1–5.0 parts of the photocuring rate accelerator) were not cured where exposed actinic light under conditions which cured our above-described compositions (the compositions of Embodiments 4 and 5 of the Preferred Embodiments). Neither was a mixture of the ethylenically unsaturated compound and the photocuring rate accelerator cured where irradiated with actinic light under conditions which cured our above-mentioned compositions (the compositions of Embodiments 4 and 5 of the Preferred Embodiments, supra).

Samples of our composition containing 0.01–5 parts of the above-named photocuring rate accelerators per 100 parts of epoxy compound were stable and did not polymerize where stored for several weeks in the absence of significant amounts of radiation including the absence of actinic light.

Epoxy compounds used in preparing cured epoxy resins are frequently admixed with additives such as diluents, fillers, plasticizers, and flexibilizers that are well known to those skilled in the art and are described in some detail in Chapters 6 and 7 of the above-mentioned Lee et al reference. We have found that moderate amounts (e.g., up to 5–10% or more) of such additives can be present in the composition of our invention without adversely effecting the quality of the cured resin obtained where the composition of our invention is cured by high energy ionizing radiation or by radiation with actinic light.

Amino compounds having the formula

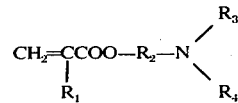

wherein $R_1$, $R_2$, $R_3$, and $R_4$ are as defined in the above Summary which were found to be especially useful in the composition and process of our invention include but are not limited to; dimethylaminoethyl methacrylate; diethylaminoethyl methacrylate; dimethylaminopropyl methacrylate; dimethylaminobutyl methacrylate; dimethylaminoethyl acrylate; diethylaminoethyl acrylate; dimethylaminopropyl acrylate; dimethylaminobutyl acrylate; those compounds having said formula in which; $R_1$ is $C_2H_5$; $R_2$ is $CH_2CH_2$; and (I) $R_3$ and $R_4$ are both; (*a*) $CH_3$ (*b*) $C_2H_5$; (*c*) $CH_2CH_2CH_3$; (*d*) $CH_2CH_2CH_2CH_3$; and (*e*) $CH_2CH(CH_3)_2$; those compounds having said formula in which; $R_1$ is $CH_3$; $R_2$ is $CH_2CH_2$, $R_3$ is $CH_3$; and (II) $R_4$ is (*a*) $C_2H_5$; (*b*) $CH_2CH_2CH_3$; (*c*) $CH_2CH_2CH_2CH_3$; and (*d*) $CH_2CH(CH_3)_2$; those compounds having said formula in which $R_1$ is $CH_2CH_2CH_2CH_3$; $R_2$ is $CH_2CH_2CH_2CH_2CH_2$; and (III) $R_3$ and $R_4$ are both (*a*) $CH_3$, $C_2H_5$; (*b*) $CH_2CH_2CH_3$; (*c*)$CH_2CH_2CH_2CH_3$; (*d*) $CH_2CH(CH_3)_2$; and (*e*) $CH_2CH_2CH_2CH_2CH_3$, and those compounds having said formula in which $R_1$ is any lower alkyl group; $R_2$ is any alkylene group having 2–8 carbon atoms; $R_3$ is any lower alkyl group; and $R_4$ is any lower alkyl group.

The instant invention will be better understood by referring to the following specific but nonlimiting examples. It is understood that said invention is not limited by said examples which are offered merely as illustrations; it is also understood that modifications can be made without departing from the spirit and scope of the invention.

EXAMPLE 1

75 parts of a commercially available epoxy compound (Epon 828 obtained from Shell Chemical Company) was admixed with 25 parts of dimethylaminoethyl methacrylate to form a mixture designated "Composition 1."

A portion of Composition 1 was applied to a glass plate and irradiated with a high energy electron beam generated by a Van deGraaff generator. The radiation dosage was 1.2 Mrads. The composition cured to produce a hard film firmly bonded to the glass plate.

EXAMPLE 2

The general procedure of Example 1 was repeated. However, in this instance 90 parts of Epon 828 was admixed with 10 parts of dimethylaminoethyl methacrylate. The resulting mixture was designated "Composition 2."

A coating of Composition 2, where applied to a glass plate and irradiated with an electron beam (1.25 Mrads) formed a hard coating which adhered firmly to the glass plate.

EXAMPLE 3

The general procedure of Example 1 was repeated. However, in this instance 95 parts of Epon 828 was admixed with 5 parts of dimethylaminoethyl methacrylate to form a mixture which was designated "Composition 3."

A thin coating of Composition 3 was applied to a glass plate and irradiated as in Example 1, but using a dosage of 1.5 Mrads. The coating on the glass plate cured to form a hard film which adhered firmly to the glass plate.

EXAMPLE 4

The general procedure of Example 1 was repeated. However, in this instance the Epon 828 was replaced with Epon 1001 a commercially available epoxy compound having a higher average molecular weight than Epon 828. Lee et al state (page 20) that the average molecular weight of Epon 828 is 350–400 and that the average molecular weight of Epon 1001 is 900–1,000. 50 parts of Epon 1001 was admixed with 50 parts of dimethylaminoethyl methacrylate to form a mixture which was designated "Composition 4."

A film of Composition 4 was applied to a glass plate which was then irradiated as in Example 1 using a dosage of 1.25 Mrads. The film cured to form a hard coating firmly adhering to the glass plate.

EXAMPLE 5

A film of Epon 828 was applied to a glass plate and irradiated as in Example 1. The film did not cure at a radiation dosage of 1.25 Mrads. Neither did said film cure when the dosage was increased to 8 Mrads.

EXAMPLE 6

A film of dimethylaminoethyl methacrylate was applied to a glass plate and irradiated as in Example 1. The film did not cure at a radiation dosage of 1.25 Mrads. Neither did said film cure when the dosage was increased to 8 Mrads.

EXAMPLE 7

A composition designated "Composition 7" was prepared by admixing benzophenone and a portion of the above-described Composition 1. A total of 1% benzophenone, based on the weight of the resulting composition 7 was admixed with said composition 1.

EXAMPLE 8

A series of runs was made repeating the general procedure of Example 7. However, in said runs, Composition 1 was replaced with Compositions 2–4 (as indicated in Table I) and the resulting benzophenone-containing compositions, each of which contained 1% benzophenone, were designated as indicated in said table.

TABLE I

Preparation of Benzophenone-Containing Compositions

| Run No. | Starting Composition | Designation of Resulting Comp. |
| --- | --- | --- |
| 1 | Composition 2 | "Composition 8–A" |
| 2 | Composition 3 | "Composition 8–B" |
| 3 | Composition 4 | "Composition 8–C" |

EXAMPLE 9

A film of Composition 7 was applied to a glass plate which was then irradiated for 6 minutes with actinic light from a 275 watt Westinghouse Sunlamp positioned to provide a radiation dosage of 4,000 microwatts per square centimeter of the film's surface as measured with a short wavelength ultraviolet meter. The film cured to form a hard smooth coating firmly adhering to the glass plate.

EXAMPLE 10

A series of runs was made using the general procedure of Example 9 but modified by replacing Composition 7 of Example 9, with Compositions 8-A, 8-B, and 8-C as shown in Table II. Irradiation time, for each run is also shown in Table II.

TABLE II

Irradiation of Compositions with Actinic Light

| Run No. | Composition Irradiated | Irradiation Time, Minutes |
| --- | --- | --- |
| 1 | 8–A | 40 |
| 2 | 8–B | 40 |
| 3 | 8–C | 6 |

In each instance the film of irradiated composition cured to form a hard smooth film firmly adhering to the glass plates.

EXAMPLE 11

A mixture, designated "Composition 11" was prepared by admixing 99 parts of Epon 828 and 1 part of benzophenone.

A film of Composition 11 was applied to a glass plate and irradiated according to the general procedure of Example 9. Said film was not cured after being irradiated for 6 minutes. Neither was it cured after being irradiated for an hour.

EXAMPLE 12

The general procedure of Example 11 was repeated. However, in this instance the Epon 828 was replaced with dimethylaminoethyl methacrylate, and the resulting mixture of dimethylaminoethyl methacrylate and benzophenone was designated "Composition 12."

A film of Composition 12 on a glass plate did not cure on being irradiated for 6, 10, and 60 minutes.

The compositions of this invention are useful for forming hard protective films on surfaces including wooden, metal, and glass surfaces. Such surfaces include the surfaces of furniture walls, countertops, sinks, floors, roofs, artistic designs, and the like. Other uses of said compositions will, because of our disclosure be readily apparent to those skilled in the art.

Preferred film thickness (thickness of cured film; are 0.05–20 (or 0.1–5) mils; however, the film thickness is not critical and excellent results have been obtained with thicker and thinner films. It is well known to those skilled in the art that the presence of fillers which are opaque to actinic light (actinic radiation) can substantially decrease the penetration of actinic light into (or through) a film, coating, or layer of a photocurable composition and hence decrease the thickness of such composition which can be cured where the composition is exposed to a specific or predetermined dosage of actinic radiation. Such fillers are known to those skilled in the art.

It is also known to those skilled in the art that high energy ionizing radiation has certain depths of penetration in any given system depending on the energy and type of radiation.

As used herein the term "percent (%)" means parts per hundred, and the term "parts" means parts by weight.

As used herein the term "lower alkyl group" means an alkyl group having 1 to about 7 carbon atoms.

As used herein the term "Mrad" means megarad.

We claim:

1. A process for polymerizing a radiation curable composition consisting essentially of 40–95 parts of an epoxy compound having the formula

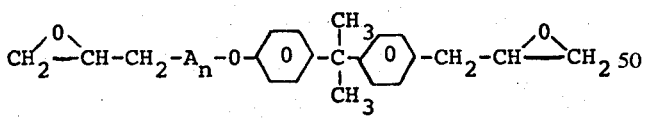

in which A is

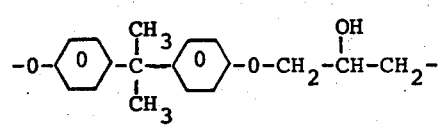

and $n$ has an average value of 0–13 and 5–60 parts of an ethylenically unsaturated compound having the formula

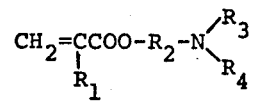

in which $R_1$ is hydrogen or a lower alkyl group, $R_2$ is an alkylene group having 2–8 carbon atoms, and $R_3$ and $R_4$ are lower alkyl groups, said process comprising irradiating said composition with 0.01–10 Mrads of high energy ionizing radiation.

2. The process of claim 1 in which $n$ is 0–6.

3. The process of claim 1 in which $R_1$, $R_3$, and $R_4$ are $CH_3$ and $R_2$ is $CH_2CH_2$.

4. The process of claim 1 in which $R_1$, $R_3$, and $R_4$ are $C_2H_5$ and $R_2$ is $CH_2CH_2$.

5. A process for polymerizing a radiation curable composition consisting essentially of 40–95 parts of an epoxy compound having the formula

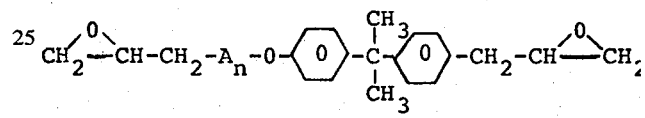

in which A is

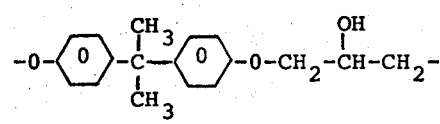

and $n$ has an average value of 0–13 and 5–60 parts of an ethylenically unsaturated compound having the formula

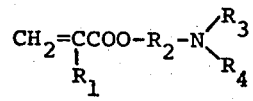

in which $R_1$ is hydrogen or a lower alkyl group, $R_2$ is an alkylene group having 2–8 carbon atoms, and $R_3$ and $R_4$ are lower alkyl groups, and 0.01–5 parts of a photocuring rate accelerator per 100 parts of the epoxy compound, said process comprising irradiating a film of said composition with actinic light for 0.001–120 minutes at a rate to provide 0.0001–20 watts per square centimeter of film surface.

6. The process of claim 5 in which the photocuring rate accelerator is benzophenone, dibenzosuberone, or acetophenone.

7. The process of claim 5 in which $n$ is 0–6.

8. The process of claim 5 in which $R_1$, $R_3$, and $R_4$ are $CH_3$ and $R_2$ is $CH_2CH_2$.

9. The process of claim 5 in which $R_1$, $R_3$, and $R_4$ are $C_2H_5$ and $R_2$ is $CH_2CH_2$.

* * * * *